Patented Dec. 6, 1927.

1,651,886

UNITED STATES PATENT OFFICE.

JAMES O. HANDY, OF PITTSBURGH, PENNSYLVANIA, ASSIGNOR TO PRIMOS COMPANY, A CORPORATION OF DELAWARE.

LEAD PRODUCT AND PROCESS OF PRODUCING THE SAME.

No Drawing.     Application filed September 26, 1924.   Serial No. 740,048.

This invention relates to certain lead products, particularly red lead, as well as to a method or process of producing the same and it is peculiarly adapted to the recovery of lead values such, for example, as are contained in scrap storage battery plates and the present application is in the nature of a continuation of and a substitution for my copending application Serial No. 610,376, filed January 2nd, 1923, as to common subject matter disclosed and claimed.

The primary objects of the invention are the recovery of certain lead values from material containing lead sulphate such as the scrap battery plates mentioned and particularly the production of a red lead of extremely high quality having properties which impart greatly improved characteristics to paints in which it is incorporated as a pigment. As a further object I recover the lead oxides and the pure grid metal from such plates in condition to be used again commercially without performing any smelting or reduction process.

More specifically considered and with a view to a special use the following may be enumerated as objects of the invention: (1) the production of a pigment which will not "run" or "sag" when mixed with the desired quantity of raw linseed oil and applied to a sharply sloping surface; (2) the production of a pigment which will make the paint more easily spread with the brush; (3) the production of a pigment which will enable the paint to cover at least thirty percent more perfectly than similar pigments so far in use; (4) the production of a red lead pigment which can be used in paints in volume considerably greater than heretofore possible; (5) the production of a red lead pigment which when used with linseed oil settles very slowly in containers; (6) the production of a pigment which after settling can be easily stirred up again; and (7) the production of a pigment which will not harden in containers.

In carrying out my invention I prefer to use scrap storage battery plates as my raw material but it will, of course, be understood that any other material having the same or similar characteristics might be used.

The grids of battery plates are made generally of lead and antimony alloy containing approximately 94% lead and 6% antimony and usually very low in impurities or foreign matter. In the manufacture of the ordinary form of lead storage battery plates the lead antimony alloy is generally cast into grids and these are filled with pulverized lead compounds, that employed for negative plates being generally litharge, PbO, and that for the positive plates generally being a mixture of litharge and red lead known respectively by the symbols PbO and $Pb_3O_4$.

In the action of charging these lead storage batteries, the plates are immersed in sulphuric acid. The electric current operates to change the PbO of the negative plate into metallic lead in spongy or finely divided form while the filler or active material on the positive plate is transformed into lead peroxide having the symbol $PbO_2$.

The discharge of the battery in service produces lead sulphate known by the symbol $PbSO_4$, in both plates. Recharging decomposes most of the lead sulphate.

In commercial practice the usual guarantee given with a lead accumulator or storage battery is eighteen months' service and if this is exceeded the life is thought to be above the average. After the batteries have ceased to operate satisfactorily because more lead sulphate has formed than can be broken up by the recharging process it is the customary practice to sell the old plates. This scrap is ordinarily collected by the scrap dealers and sold to the smelters.

Generally speaking scrap plate has a composition about as follows: 50% lead antimony alloy, 22.5% lead sulphate, 10% lead peroxide, 15% lead monoxide, 2.5% spongy lead.

Red lead produced by my improved process is particularly adapted for use as a pigment in paints and before proceeding with a description of the invention it should be pointed out that as at present manufactured the best grades of commercial red lead contain a certain percentage of litharge (PbO). Litharge is an active oxygen compound of lead and when mixed with the linseed oil commonly used in paints the two react upon each other in such a way as to produce a number of objectionable characteristics such as early hardening of the paint, etc., as is well known in the art. In the manufacture of my improved red lead I greatly reduce the percentage of litharge in the finished product replacing it preferably with lead carbonate (PbCO$_3$). In other words I produce a red lead which has as its non-red lead constituent a predominant quantity of lead carbonate instead of litharge.

Where storage battery plates are used (as preferred) the first step in my process is to mechanically separate the metallic grid from the filler. This I prefer to do by the use of a ball or pebble mill, corrugated jaw crusher, corrugated rolls, or other suitable device which detaches the more brittle non-metallic filler from the grids, the crushing process by which this is accomplished being carried far enough to clean even the finer parts of the grids so that they may be screened out from the filler. This I have found to involve crushing the filler to 20 mesh or in some cases even to 40 mesh. If any of the grid particles pass they will contaminate with lead antimony alloy the purer mixture which constitutes the filler. Hence the necessity for thorough separation by sifting or floating.

It is evident that where a rolling operation is used, especially if corrugated rollers are employed, the disintegrative force is one which will subject the material to a combination of distorting effects involving compressive, torsional and tensional strains, all of which are non-percussive in character.

As a second step in my improved process I grind the finely divided filler in a pebble or tube mill with a sufficient quantity of an alkali metal carbonate solution such, for example, as one of sodium carbonate or of sodium bicarbonate to decompose the lead sulphate with the production of lead carbonate and sodium sulphate as a by-product in solution, the mill being run until a suitable test shows that the alkali metal carbonate solution has completed its work. Then the sodium sulphate solution is drawn off as completely as possible and the powdered residue is washed with water sufficiently to remove the remaining sodium sulphate. The sodium sulphate in the solution which was drawn off may be recovered by evaporation and crystallization and sold as Glauber's salt or calcined and sold as salt cake and the wash waters may be used to dissolve new portions of alkali metal carbonate or bicarbonate for treatment of successive batches. The washed residue comprises, substantially, lead carbonate, lead oxides and spongy metallic lead and it is free from lead sulphate, the approximate average composition thereof being as follows: lead carbonate 35 to 45%, lead dioxide 15 to 25%, lead monoxide 20 to 30% and metallic lead up to 10%.

The residue is then dried and the cake broken and exposed in layers of suitable depth to the action of natural draft through a furnace preferably of the muffle type at a temperature between 350 and 500 degrees C., or better between 450 and 500 degrees C. At this temperature in a space of from 2 to 6 hours, by the decomposition of the lead carbonate and the interaction of the lead oxides and the spongy lead and by the subsequent combination with the oxygen of the air, a commercial red lead of unusually good quality may be produced especially as regards fineness of texture and percentage of true red lead. As to the latter a product containing anywhere from 70 to as high as 98% or so of true red lead is readily made and with marked uniformity I can produce a product of substantially the following composition, namely, 94% of red lead, 4% of lead carbonate and 2% of litharge, these substances being designated by the formulas Pb$_3$O$_4$, PbCO$_3$, and PbO. If litharge is desired the temperature must be raised to about 550° C. and if the heating takes place at 600 to 650° C. light and fine grained litharge is obtained having the usual light brownish color which is desired by the trade.

I find, however, in producing litharge, that the greatest care must be exercised in separating the last traces of the more brittle lead antimony battery plate substance from the filler for if there be any antimony present in the material during treatment in the furnace it is difficult if not impossible to make a satisfactory litharge in this way. Litharge, in order to be acceptable to certain large consumers, must be soluble in dilute nitric acid without leaving more than insignificant traces of insoluble matter. In order to meet this requirement unfailingly, therefore, I prefer to use negative battery plates only in manufacturing litharge according to my invention because, in service, they do not become so brittle as do the positive ones nor do they oxidize as much. Consequently it is easier to obtain complete separation of the grid substance from the filler in negative plates than it is in positive plates. Otherwise the procedure is similar to that used for the production of red lead except for the higher temperature used in the final treatment in the furnace.

Furthermore, the intermediate product resulting from the treatment of mixed filler with the alkali metal carbonate solution, by virtue of its high lead carbonate content, constitutes an excellent brown pigment of attractive color without the necessity for further treatment except washing and drying. Also the intermediate product resulting from the treatment with alkali metal carbonate solution of negative filler alone makes a very high quality gray pigment. The product contains approximately 50 to 70% lead carbonate, 15 to 25% lead monoxide and up to 15% metallic lead.

I have found it advantageous to use about 10% excess of sodium carbonate and to use it in a strength which preferably does not exceed 10%, that is to say, one part dissolved in nine parts of water, but I have also been able to use solutions from 5% to saturation successfully although the 10% solution is rather more rapid in its action. In connection with the use of the strong solution like the saturated one referred to, it is desirable to add a small amount of bicarbonate of soda as otherwise some of the lead may be dissolved and the process thereby complicated. An alkali metal bicarbonate may be used by itself or a mixture of the same with an alkali metal carbonate.

In my process it is important to use the alkali metal carbonate solution without the application of heat which greatly reduces the expense besides making it possible to carry out the process of grinding and conversion of the lead sulphate into lead carbonate simultaneously in a pebble mill.

My process regenerates in pure form all of the material used in the manufacture of storage battery plates and also recovers the lead values in the sediment or mud which deposits in storage batteries during service since this sediment is simply dislodged filler. Furthermore the materials may be readily disposed of in the trade or in industries using either red lead or litharge.

The intermediate products and the lead oxides produced by my process may be when necessary further refined by grinding and flotation to remove the heavier or coarser particles whose presence is not beneficial.

I believe it is novel with me to use a solution of an alkali metal carbonate or bicarbonate, for the conversion of material containing lead sulphate directly into a form in which after heating it becomes commercally useful. No impurities being introduced by the process the material again becomes immediately available for use. The solution may be used at any temperature but there are economic and technical reasons for using it without heating.

My improved process is also applicable to any natural or artificial substances consisting of or containing lead sulphate or carbonate as well as to those obtained from storage batteries.

There may be some commercial situations in which it would be allowable or desirable to use caustic alkali solution in admixture with an alkali metal bicarbonate or normal alkali metal carbonate or with both but the process as more specifically above described is the one that I prefer.

Caustic soda solutions, (sodium hydroxide), converts lead sulphate into hydroxide and sodium sulphate but it has the disadvantage of dissolving large quantities of lead which must afterwards be recovered.

It is to be observed furthermore that the reaction of sodium hydroxide solution on lead sulphate is a reversible one and therefore it is difficult if not impossible to make a complete transformation commercially in this manner and failures have resulted from such attempts. The use of sodium hydroxide is much more expensive and harder on the workmen than is sodium carbonate which I prefer to the other alkali metal carbonates and bicarbonates.

I have found that a red lead pigment produced in the above manner, and having the above indicated approximate analysis will be in a state of subdivision which is extremely fine and this contributes greatly to the non-settling and non-hardening qualities of a paint embodying my product as well as to its great spreading and covering properties. Furthermore, the fact that the non-red lead constituent of my product contains a predominant quantity of lead carbonate instead of litharge makes it unusually valuable as a pigment since, when mixed with linseed oil, there is minimum disturbance due to reaction between the oil and the litharge, the litharge being substantially reduced in quantity over what is ordinarily found in the average commercial red lead. Lead carbonate does not react with linseed oil to produce the detrimental effects produced by the union of linseed oil with litharge. A paint, therefore, made with my pigment will not "run" or "sag" when mixed with half its weight of raw linseed oil and painted on a sharply sloping surface. The paint is spread with unusual ease with the brush and can be made to cover the same surface at least 30% more perfectly than can be done with commercial red lead paint made on the same formula. It is possible to make a paint from my red lead which contains at least twice the volume of red lead which would be contained in paint made from the ordinary commercial red lead product.

I claim:

1. The herein described process of separating lead values from storage battery waste which comprises mechanically dislodging and separating the brittle parts from the non-brittle, and then treating the dislodged material with a solution of an alkali metal carbonate without the application of heat.

2. The herein described process of separating lead values from storage battery waste which comprises mechanically dislodging and separating the brittle parts from the non-brittle, treating the dislodged material with a solution of an alkali metal carbonate without the application of heat, separating the residue from the resulting mixture and then roasting the residue.

3. The herein described process of separating lead values from storage battery waste which consists in mechanically dislodging and separating the brittle parts from the non-brittle, in treating the dislodged material with a solution of an alkali metal carbonate without the application of heat, in withdrawing the resulting solution, in washing the residue, and in roasting the washed product.

4. The herein described process of separating lead values from storage battery plates which consists in mechanically separating the filler from the grid, in treating the filler so separated with a solution of an alkali metal carbonate without the application of heat, in removing the solution from the residue, and in roasting the residue.

5. In the herein described process of recovering lead values from material containing metallic lead or lead alloy, lead oxides and lead sulphate, the step which comprises grinding the material in the presence of an alkali metal carbonate solution.

6. In the herein described process of recovering lead values from material containing metallic lead or lead alloy, lead oxides and lead sulphate, the steps which comprise grinding the material in the presence of an alakali metal carbonate solution, drawing off the resulting alkali sulphate solution, and washing the residue.

7. In the herein described process of recovering lead values from material containing metallic lead or lead alloy, lead oxides and lead sulphate, the steps which comprise grinding the material in the presence of an alkali metal carbonate solution, separating the liquid from the solid residue, and then roasting the solid residue.

8. The herein described process of recovering lead values from material containing metallic lead or lead alloy, lead oxides and lead sulphate, which comprises grinding the material in the presence of an alkali metal carbonate solution without the application of heat, separating the liquid from the solid residue, and then roasting the residue.

9. The herein described process of recovering lead values from storage battery plates which consists in mechanically separating the filler from the grid, in grinding the filler and treating it with a solution of an alkali metal carbonate, in removing the solution from the solid residue, and in roasting the residue.

10. As a new article of manufacture the product of claim 9 characterized as a commercial red lead having as its non-red lead constituent a greater proportion of lead carbonate than of litharge.

11. As a new article of manufacture the product of claim 2 characterized as a commercial oxide of lead of extreme fineness and adaptability to mixture as a pigment with linseed oil.

In testimony whereof I have hereunto signed my name.

JAMES O. HANDY.